United States Patent [19]
Kuhlman

[11] Patent Number: 5,462,210
[45] Date of Patent: Oct. 31, 1995

[54] LIQUIFIED FOOD PRODUCT PUMP SYSTEM FOR SUPPLYING OF LIQUIFIED SAUCES AND OTHER PRODUCTS IN PREDETERMINED QUANTITIES

[76] Inventor: Harvey G. Kuhlman, N56 W21466 Silver Spring Rd., Menomonee Falls, Wis. 53046

[21] Appl. No.: 342,918

[22] Filed: Nov. 21, 1994

Related U.S. Application Data

[62] Division of Ser. No. 117,225, Sep. 3, 1993, Pat. No. 5,365,831, which is a division of Ser. No. 714,824, Jun. 13, 1991, Pat. No. 5,241,899.

[51] Int. Cl.[6] .................................................. B67D 5/40
[52] U.S. Cl. ........................................ 222/380; 222/504
[58] Field of Search ............................... 222/63, 334, 309, 222/380, 387, 388, 451, 504, 561, 389; 141/115, 116, 119; 99/352

[56] References Cited

U.S. PATENT DOCUMENTS

| | | | |
|---|---|---|---|
| 3,162,336 | 12/1964 | Erickson | 222/504 |
| 4,437,498 | 3/1984 | Pankratz et al. | 222/380 |
| 4,803,916 | 2/1989 | Tacconi | 99/352 |

FOREIGN PATENT DOCUMENTS

| | | | |
|---|---|---|---|
| 1075731 | 7/1967 | United Kingdom | 222/380 |
| 9100219 | 1/1991 | WIPO | 222/380 |

Primary Examiner—Andres Kashnikow
Assistant Examiner—Philippe Derakshani
Attorney, Agent, or Firm—Andrus, Sceales, Starke & Sawall

[57] ABSTRACT

A pasta cooking apparatus includes a generally rectangular cabinet including an upright cooking tank and a sauce heating chamber with a common wall, with an opening permitting water flow therebetween. The cooking water temperature and the sauce heating water are separately temperature controlled for heating thereof. A sauce chamber abuts the heating chamber and includes various sauce containers. Transfer hoses extend from the containers, through the heating chamber into nozzles located above the cooking tank. A self-contained conveyor unit within the cooking tank has an endless chain with equi-spaced pasta baskets. The cover has a top run above the tank. The baskets are pivotally mounted. The baskets are inverted in the upper run and then reset. A dish table rotates beneath the horizontal run and successive baskets drop the pasta into an aligned dish which then rotates beneath the nozzles. The unit has a 34 inch width to allow it to move through conventional doorways in small fast food restaurants. The conveyor table and pumps are driven with hydraulic motors to permit thorough cleaning of the total self-contained cooking apparatus.

6 Claims, 8 Drawing Sheets

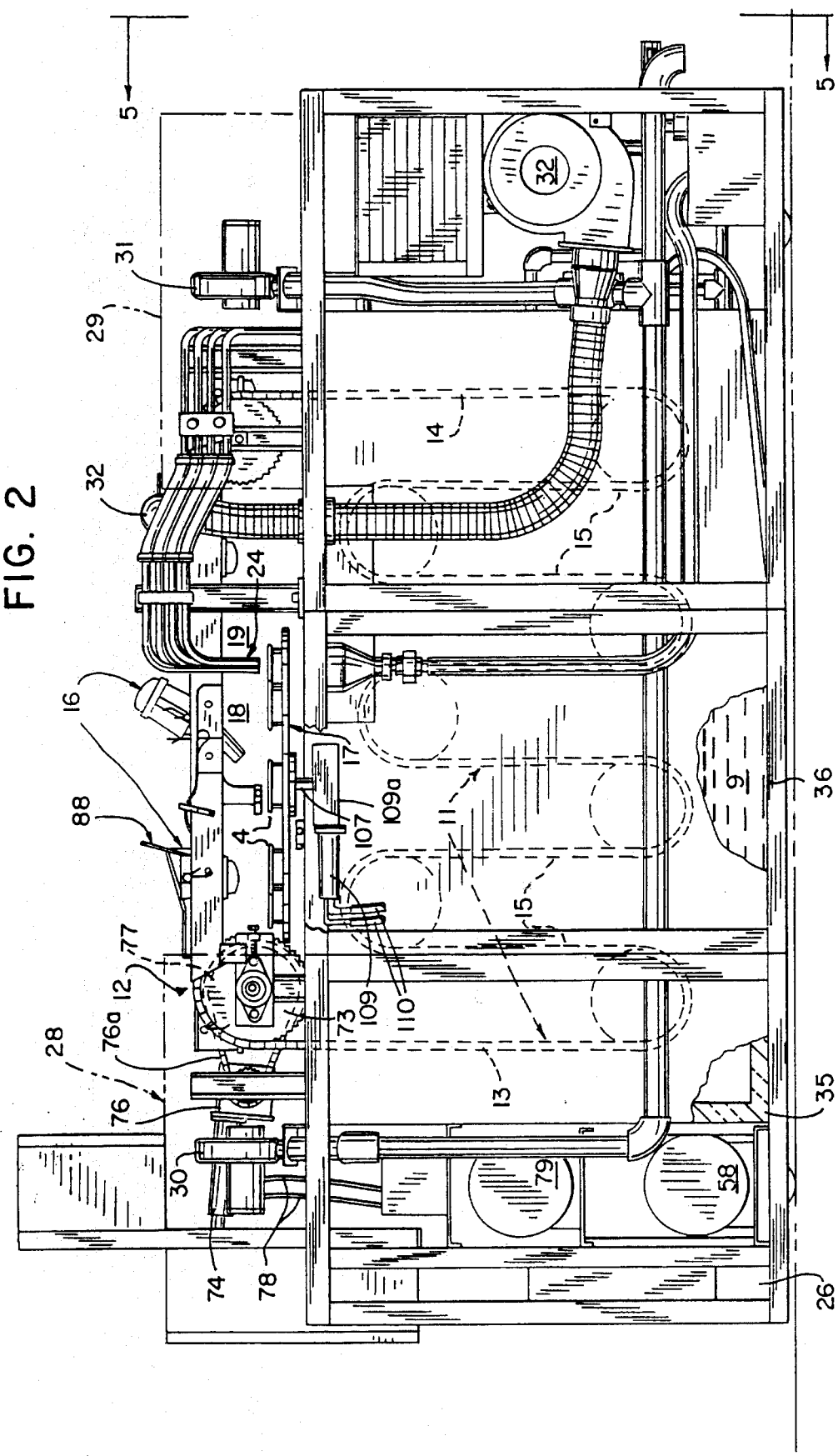

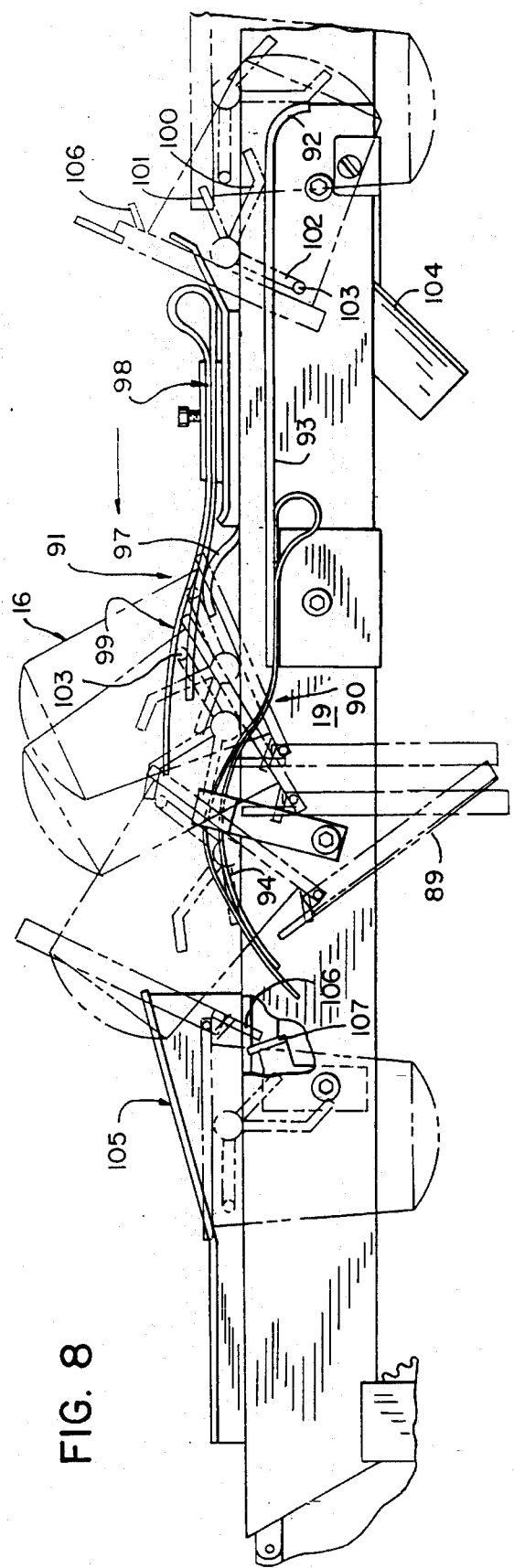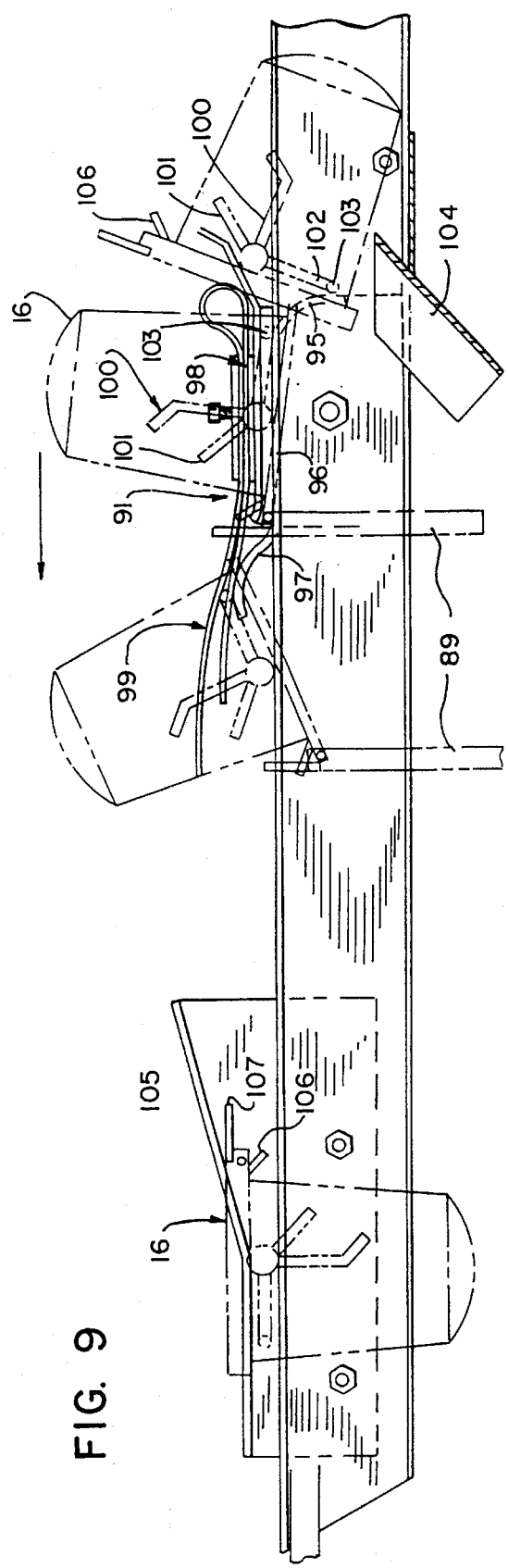
FIG. 8
FIG. 9

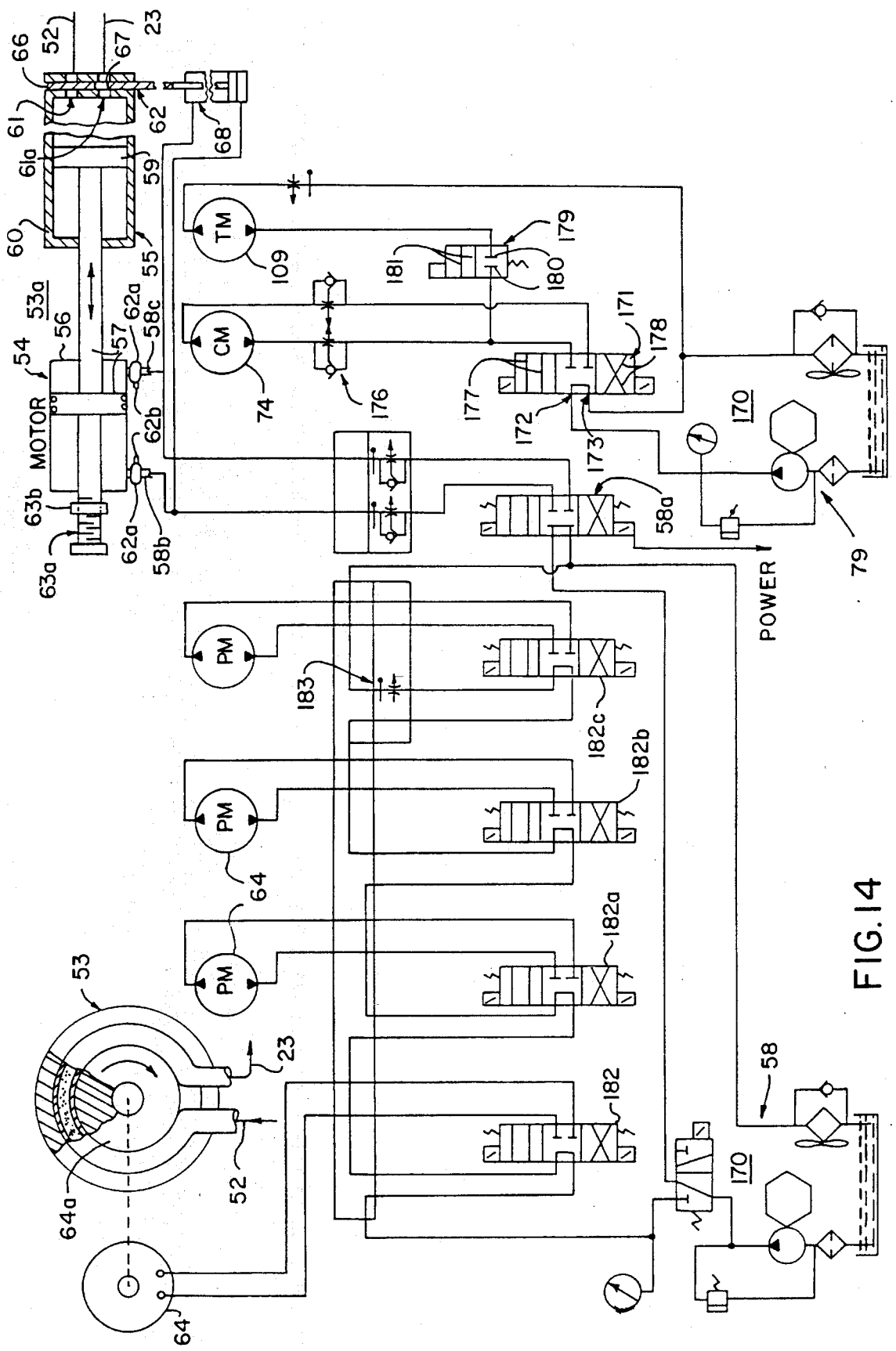

LIQUIFIED FOOD PRODUCT PUMP SYSTEM FOR SUPPLYING OF LIQUIFIED SAUCES AND OTHER PRODUCTS IN PREDETERMINED QUANTITIES

This is a division of application Ser. No. 08/117,225, filed Sep. 3, 1993, which issued as U.S. Pat. No. 5,365,831 on Nov. 22, 1994, and which in turn was a divisional application of Ser. No. 07/714,824, filed Jun. 13, 1991, now U.S. Pat. No. 5,241,899, issued Sep. 7, 1993.

BACKGROUND OF THE PRESENT INVENTION

This invention relates to on-site cooking apparatus for sequentially cooking of small quantities of serving sized portions of food product and particularly for cooking of individual pasta or the like for on-site serving of freshly cooked pasta.

Various foods are advantageously cooked and then immediately served. The cooking of an individual portion is often not practical. For example, cooked pasta, such as spaghetti and other similar pasta products, are advantageously served freshly cooked. For the lack of a practical boiling or other cooking apparatus, pasta is generally prepared in larger quantities and serving portions are then individually heated as required, using a microwave or other rapid cooking device. A prepared sauce is applied to the pasta and served. In certain large kitchens, facilities might be provided for appropriate individual cooking and serving. This however would add significantly to the cost of preparation and serving the pasta food product. Individual portions serving devices have been suggested. For example, U.S. Pat. 4,803,916 which issued Feb. 14, 1989, discloses a cooking system wherein individual portions of spaghetti are cooked for serving. Such apparatus is relatively complex and would appear to present certain difficulties from the standpoint of conforming to governmental-regulations without significant construction costs. Further, such apparatus must be thoroughly cleaned at frequent intervals, in addition to being maintained so as to provide reliable and repeatable functioning.

Any on-site apparatus used for cooking of pasta requires cooking using relatively high temperature water. The apparatus must be provided with appropriate safety features to prevent harm to the operating personnel. In addition, the apparatus may not be used for certain periods of the day. A semi-portable unit which could be moved readily when not in use would reduce the space requirements in the restaurant, with a reduction in the cost factor. Further, a semi-portable apparatus could reduce the initial installation cost and permit ready moving from one location to another.

In summary, a more efficient cooker from on-site cooking and serving of spaghetti, particularly for a relatively small fast food restaurant, will permit rapid preparation and sale of a high quality pasta at reasonable cost. The cooker must comply with various governmental specifications as to operation, cleaning and the like and particularly permit cost efficient cleaning and servicing.

SUMMARY OF THE PRESENT INVENTION

The present invention is particularly directed to a supply unit and particularly a piston pump unit for application of sauce and other liquified food product which may include soft solid chunks of material and particularly to a sauce which includes meat, vegetable products and the like in a system for delivery of predetermined volume of the sauce to receivers, and more particularly to such a pump unit for sequential delivery of sauce to a series of food containers. Thus, the present invention is particularly adapted for application to an on-site cooking apparatus as discussed in the Background Of The Invention, and in particular, for delivery of a sauce to individual containers including a cooked product, such as pasta, as the containers move through a sauce receiving station. Generally, in accordance with the present invention, the supply unit includes a piston-cylinder unit having a piston slidably mounted in with a cylinder with a piston rod extending outwardly from a first end. The opposite end is closed by a valve unit including an inlet port and an outlet port. A common valve member is provided for sliding movement within the end and has an opening to alternately open the inlet port and the outlet port. The valve member slides through the port to align the opening therewith. The sliding movement of the valve member is separately powered with sufficient force to insure severing of any food product as it moves through the ports and insures severing of any chunky food product movement of the opening from a port. Individual motor units, preferably hydraulic cylinder units, are connected to the piston unit of the supply unit and the valve plate to provide synchronized operation thereof and permit the controlled filling of the piston cylinder unit and discharge of predetermined quantities through the outlet opening. The hydraulic cylinder motor units are coupled to an interrelated common pressurized source with automatic coupling of the two piston cylinder units to provide synchronous operation whereby the valve plate member is moved to open the inlet port with the outward movement of the piston within the piston-cylinder unit and to close the inlet port and open the outlet port in synchronism with the reverse movement of the piston-cylinder unit. In a preferred construction, the piston-cylinder motor unit for the operating of the supply unit includes an extension of its piston rod with an adjustable stop member mounted thereon. The stop member engages the cylinder of the motor unit to automatically create a reversal of the movement of said motor unit through the feedback pressure in the pressurized supply lines. Common supply lines are also connected to the piston cylinder drive for the valve member to provide the desired synchronized movement.

The system thus provides a highly effective, simplified sauce supply for positive delivery of predetermined quantities of a sauce in cyclical sequence with the volume controlled by the simple mechanical stop unit.

As applied to a pasta cooking apparatus, it provides for rapid and accurate application of the sauce product to sequentially filled serving sized containers as more fully disclosed in applicant's issued parent patent in the Background Of The Invention, as well as background art shown in such application.

The cooking apparatus is preferably constructed with an integrated cooled sauce supply and a sauce heating chamber to supply the sauce in metered amount at the food unloading station. An indexed unload unit includes a plurality of food trays or dishes which are sequentially aligned with the basket discharge location and a sauce discharge location. The sauce supply includes pump units to establish individual pressurized sauce lines for the several individual sauces. The apparatus can readily conform to the many governmental or like specifications for servicing and maintenance.

DESCRIPTION OF THE DRAWINGS

The drawings furnished herewith generally illustrate the best mode presently contemplated for carrying out the invention and are described hereinafter.

In the drawings:

FIG. 2 is an enlarged side view of the cooking apparatus shown in FIG. 1, with cabinet walls removed;

FIG. 8 is a view taken generally on line 8—8 of FIG. 7;

FIG. 9 is a view taken generally on line 9—9 of FIG. 7;

FIG. 14 is a schematic of a hydraulic operating system for the apparatus of FIGS. 1–12.

DESCRIPTION OF THE ILLUSTRATED EMBODIMENT

Figure 1:
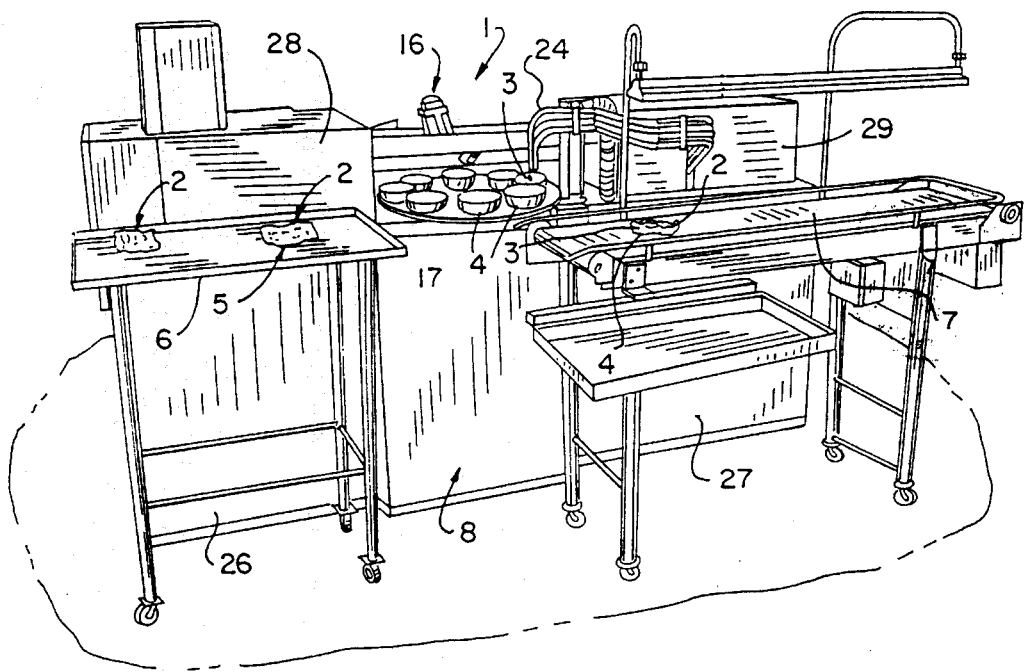
FIG. 1 is a pictorial view of a pasta cooking apparatus installation in accordance with an embodiment of the present invention.
Figure 5:
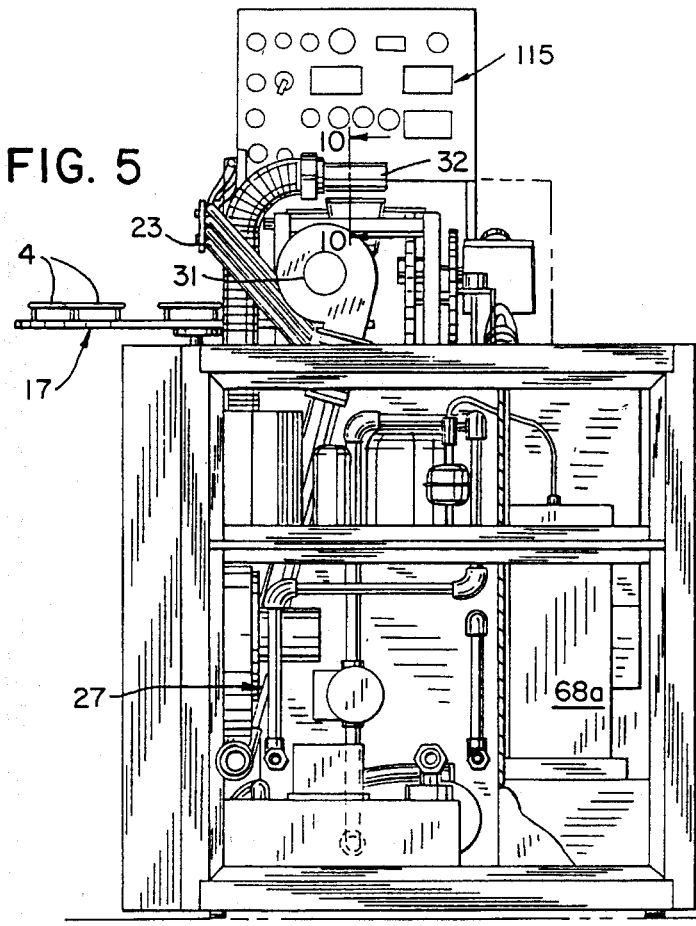
FIG. 5 is an end view taken on line 5—5 of FIG. 2 and illustrating a control end of the cooking unit shown in FIGS. 1–4.

Referring to the drawings and particularly to FIGS. 1–4, a pasta cooking apparatus 1 is illustrated for cooking of small individual sized servings or portions 2 of pasta and providing for automatic application of a selected sauce 3 with the sauce covered pasta delivered in a suitable serving dish 4 or the like. In the illustrated embodiment, the individual servings 2 are prepackaged as at 5 for manual insertion into the apparatus. A supporting table 6 is shown for maintaining a supply of packages 5. The sauce covered pasta in the serving dishes 4 is also manually removed and delivered to a suitable conveyor 7, or other delivery unit, for serving of the freshly prepared pasta to the customer.

Generally, the illustrated apparatus 1 includes an outer enclosing cabinet 8. An open top cooking tank 9 is located to the front side of the cabinet 8. A loop conveyor mechanism 10 is located in the tank 9. Mechanism 10 includes an endless container conveyor 11 having a horizontal top run 12 spaced upwardly above the cooking tank 9. The conveyor 11 includes opposite vertical end runs 13 and 14 connected to a serpentine horizontal-bottom run 15 located within the cooking tank 9. A plurality of equally spaced cooking container units shown as baskets 16 are secured in equally spaced relationship to the conveyor and carried through the continuous loop. In moving through the top run 12, the container units 16 are automatically pivoted to an inverted, discharged position to discharge the cooked pasta 3, as shown most clearly in FIGS. 8 and 9 and more fully described hereinafter. The container units 16 are then reset to an upright position to receive a new charge of the uncooked pasta 3 prior to moving into the vertical end run.

An indexed dish table 17 moves beneath the discharge station or location 18 in the horizontal run 12 to sequentially align a tray or dish 4 with the tilted container unit 16 to receive the cooked pasta. The table 17 is then indexed to a sauce application location 19. In the illustrated apparatus, a sauce chamber 20 (FIGS. 3 and 4) is located in parallel relation to the cooking tank 9. The sauce chamber or compartment 20 is located to the back side of the cabinet and includes a plurality of different sauce containers 21, each containing a different sauce 22. Thus, one container 21 may contain a simple tomato sauce, another may contain a sauce containing meat while still a further container may contain a cheese or cream sauce. Each of the containers 21 includes a separate discharge line 23 which is extended through the apparatus and terminates in a selected one of a plurality of nozzles 24 at location 19. The sauces 22 in the container 21 are held in a cooled state, as more fully developed hereinafter. The sauce 22 should be applied in a heated state however to provide a hot prepared serving in the illustrated embodiment, a heating chamber or tank 25 is located between the cooking tank 9 and the sauce chamber 20 to heat the sauces moving through the line 23 from the containers 21 to the plurality of related nozzles 24 at the sauce applicating location. The nozzles 24 are located in vertical alignment with a dish 4 at the location. The nozzles 24 are activated to selectively supply anyone of available sauces from containers 21 in accordance with a controlled discharge from the nozzles 24.

The opposite ends of the cabinet are extended outwardly and define end equipment chambers 26 and 27 within which various drive and control devices are located. As more fully developed hereinafter, chamber 26 is used as hydraulic power source unit and chamber 27 as an auxiliary control equipment chamber.

In addition, top protective enclosures 28 and 29 are provided at the opposite ends of the cabinet located in overlying spaced relation to the opposite top ends of the vertical runs 13 and 14 of the conveyor unit 11. The top of the tank 9 is exposed at the opposite ends within enclosures 28 and 29 to allow movement of the basket or container units 16 upwardly from the cooking bath of tank 9 into the upstream end of the horizontal run 12. The open ends allow hot, moisture air to rise into the enclosures. Further, the container units 16 tend to carry a significant amount of hot water on and in the cooked pasta 3. The hot, moist air and the hot water present a possible damaging environment. The protective enclosures 28 and 29 cover the air and water environment and permit safe discharge. In the illustrated embodiment, suction fans 30 and 31 are located at the opening to the respective chambers 28 and 29 for drawing of the moist, hot air and water from within the entrance area of the enclosures 28 and 29 and discharging the same in a safe manner. In addition, a suitable blower 32 terminates in nozzle 33 aligned with the upper ends of container unit 16 before the unload station 18. The blower 32 establishes an air blast 33a for positively blowing of the excess water from the container units 16 moving from the end enclosure through the top run of the conveyor 11.

The illustrated cooking apparatus operates generally as follows.

The basket conveyor mechanism 10 and the indexing table 17 are driven in synchronism to circulate the baskets 16 through the cooking tank 9, and then the horizontal run 12 with each basket 116 tipped to discharge pasta 3 into an aligned dish 4, reset with the cover open to receive fresh pasta 3, and the covered closed for recycling of the basket. The table 17 is indexed after pasta is discharged into the dish 4 to align a cooked pasta filled dish with the sauce nozzles 24, one of which is activated to deposit the proper sauce onto the pasta. The system continues operating with the baskets moving continuously through the loop, and the table being indexed in a synchronized stepped movement to receive the pasta and sauce.

One preferred embodiment is more fully illustrated and described as follows.

The cooking tank 9 and the sauce heating chamber 25 are formed as an integrated chamber unit having the side walls 35 and bottom wall 36 suitably thermally insulated for maintaining controlled temperatures of the water therein. A metal plate 37 is located within the integrated chamber unit and defines a common wall between the cooking tank 9 and the heating chamber 25. The wall 37 terminates in slightly spaced relation to the forward end tank wall, as at 38, to allow water flow therebetween with a common upper water level. An overflow pipe 39 is located in the sauce heating chamber 25 adjacent the wall opening. The pipe 39 serves to skim water from the water bath and particularly from the cooking water. Thus, cooking of pasta results in introduction of starches and the like from the pasta into the water and the continuous withdrawal serves to prevent abnormal build up thereof within the water.

A cold water supply pipe 40 is coupled to the sauce chamber end wall and extends into the sauce heating chamber 25 to supply water to the integrated chamber unit. The cold water supply replaces the water skimmed off by the overflow pipe and any water lost through evaporation, and serves to control the temperature of the water in the sauce heating chamber.

A circulation line 41 has an inlet connected to the sauce heating chamber 25 and to the bottom end of the cooking tank 7. A pump unit 42 in line 41 recirculates the water to establish flow from the heating chamber to the cooking tank.

A thermocouple 43 or other suitable sensor is coupled to the water in the sauce heating chamber 25 to control the temperature of the sauce heating water by controlling the flow rate and the cold water additive.

A thermocouple 44 or other suitable sensing is coupled to the water in the cooking tank to hold the water therein at a selected minimum cooking temperature and within a maximum cooking range. Thus, a water heating unit 45 is located in the tank 9 to heat the water therein as necessary.

The level of the water in the chamber unit is controlled by a suitable level sensor shown as including a pair of sensor electrodes 46 and 47 mounted to the sauce heating chamber. The electrodes 45 and 46 are of different lengths and serves to maintain the water level within a selected level range for appropriate cooking of the pasta and heating of the sauce.

A common metal cover 48 is releasably secured over the top of the integrated cooking tank and sauce heating chamber. The ends of the cover are located to permit the movement of the conveyor mechanism with the pasta baskets 16 from and into the cooking tank 9.

The sauce chamber or compartment 20 is located immediately adjacent to the sauce heating chamber 25 with the insulated exterior wall 35 therebetween. The compartment 20 extends throughout the length of the heating chamber. The illustrated embodiment of the invention provides for selective application of four different sauces. Four individual sauce containers 21, shown identically constructed, are mounted in side-by-side relation within the sauce compartment 20. Referring to the container 21, shown to the left end of the chamber 20 in FIG. 3, the sauce container 21 is a generally rectangular and open top unit 50 having a releasable top cover 51. The bottom wall of the container 21 is funnel-shaped and tapers down to a discharge outlet pipe 52. A pump unit 53 is connected to the outlet pipe 52. The pump unit 53 may be of any suitable construction. The pump unit 53 which handle essentially only liquid sauce are preferably known peristaltic pump units.

Figure 3:
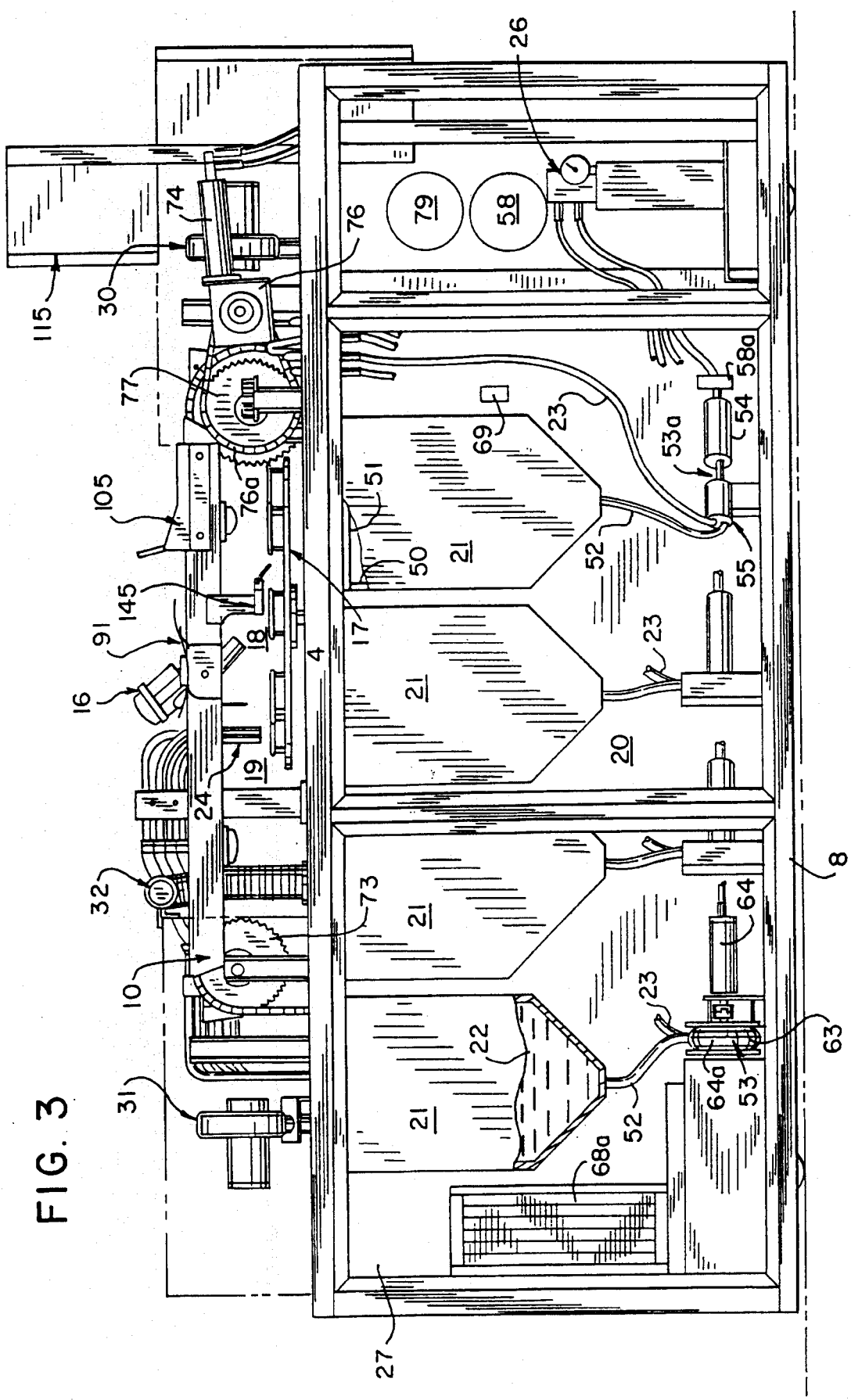
FIG. 3 is a view similar to FIG. 2 from the opposite side of the cooking apparatus.

In a preferred structure, at least one pump unit 53a is a hydraulically actuated reciprocating pump unit, such as shown coupled to the container 21 to the right end of chamber 20 in FIG. 3. The pump unit 53a is selected to pump chunky or heavy sauces and includes a pumping section 54 and a sauce transfer section 55. The pumping section 54 of pump unit 53a is shown as a hydraulic cylinder 56 having a piston and piston rod 57, connected to the transfer section 54. The cylinder 56 is connected by a valve 58a in lines 58b and 58c to the hydraulic supply unit, shown as the motor driven hydraulic pump 58 housed in the end power chamber 26, and more fully shown in FIG. 14. The reversing valve 58a may operate automatically to reciprocate the movement of the piston and rod 57 such that each stroke delivers one serving of sauce. Alternatively, valve 58a may be electrically actuated unit to reverse the hydraulic supply to the cylinder 56 at a fixed or adjustable rate upon demand for sauce from the container coupled to the pump unit 53a to deliver the desired volume of sauce. Although unit 53a is shown with a horizontal stroke, the unit may be located in any orientation but is preferably close to container 21. In practice, a vertical orientation may be desirable to minimize the horizontal space requirements.

The sauce transfer section 55 of pump unit 53a includes a pump piston 59 coupled to rod 57 and reciprocating in a cylinder 60. A sauce pump inlet port 61 is connected to the container outlet line 52, and a pump outlet port 61a is connected to the sauce line 23. When the piston 59 is withdrawn, sauce is drawn into cylinder 60 through the inlet line 52. When piston 59 is moved outwardly, sauce is discharged through outlet port 61a into the line 23 to the discharge nozzle 24 for placing into the aligned dish.

Each of the hydraulic lines 58b and 58c to the cylinder 56 includes a control valve 62a to vary the flow rate and thereby the speed of movement of the drive piston and rod 57 and the interconnected piston 59 of transfer section 55. The control of piston 59 controls the action of the transfer section 55. The valves 62b is a flow control valve having control, shown as a manual control 62b, for setting of the valve opening and thereby the response speed of the system.

The shaft 57 extends rearwardly of cylinder 56 as at 63a to provide a portion control. The shaft 63a has an adjustable stop 63b, shown as a stop nut on a threaded portion of the shaft 63a. The position of the stop nut 63b controls the stroke of the piston and rod 57 and thereby the stroke of the piston 59 in cylinder 60. The quantity and weight of the sauce passed through the transfer section 55 to the dish varies with the stroke of piston 59 and thus is adjustable through the setting of stop 63b. The illustrated piston pump unit 53a is particularly adapted to pumping of sauces with relatively large pieces of food product therein. Thus, various sauces 22 may include food pieces of meats, mushrooms, clams or the like. A special cutoff valve 62 is built into the cylinder 60 to positively open and close the ports 61 and 61a with the food pieces.

The pump unit 53a may be operated using a suitable timer, not shown, to actuate the valve 58a and cause the reciprocation of the pump unit 55. The time required during the delivery stroke and the suction stroke maybe separately set to provide proper transfer of the sauce from container 21 to the dish 4. The length of the stroke is set by the adjustment nut 63B.

The sauce containers 21 assigned to store and supply clear sauces such as tomato, cheese and the like may use the simpler peristaltic rotating pump 53. Typically, the pump 54 includes a circular confined tube 63 having a closely spaced inlet 63a and outlet 63b. A rotary hydraulic motor 64 is coupled to rotate a rotor cam 64a which engages the flexible transfer tube 63 and progressively compresses the tube toward the outlet 63b to force the sauce into the line 23, while drawing sauce into the tube through the inlet 63a behind the compressed point or area of the tube.

The separate sauce lines 23 extend from the pumps units 53 and 53a through the bottom of the sauce chamber 20 to one end thereof and then upwardly and over the insulated wall 35 into the sauce heating chamber 25.

The sauce lines 23 from the containers should be positively and completely-closed during the periods when the sauce is not to flow through such lines. Where a totally liquid sauce is involved, a simple liquid valve unit 65 may be used. Where the sauce includes a chunky product, such as mushrooms or like product, a valve unit 65a is preferably selected or designed to prevent such product from holding the valve even-partially open, such as a sliding plate valve unit.

As shown more clearly in FIG. 14, the sauce inlet line 52 and the sauce discharge line 23 for such products are connected to the pumping chamber by the sliding plate valve unit 62 built into the transfer piston. A valve plate 66 is slidably mounted within the body across the inlet and outlet ports 61 and 61a. The valve plate 66 includes an opening 67 corresponding in size to the ports 61 and 61a. A piston operator 68 is connected to the valve plate 66 and is activated to align opening 67 with the inlet port 61 during filling of the sauce pump 53a and with the outlet port 61a during the discharging and emptying of the sauce pump. The operator 68 is connected to the hydraulic supply with the pumping cylinder through the reversing valve 58a. The illustrated sliding plate-type of a valve unit is a typical structure which may be used. However, any other suitable positive acting valve unit may also be used.

The sliding plate 66 fits closely within the valve body and may be provided with a suitable auxiliary sealing system, if desired, to positively close the passageway in the closed position. The sliding plate 66 has the ability of positively displacing any solid material which may end up in the passageway at the end of the pumping cycle. Thus, if the unit is pumping a meat sauce with relatively heavy chunks of meat, a conventional peristalic valve or pump unit may result in lodging of the meat within the passageway and generating a potential source of leakage from the pump unit. The unit 53 with the positive closure plate will dislodge the product regardless of the particular food and valve closure product providing a highly desirable and advantageous feature.

The sauce compartment 20 is air conditioned to cool the sauce during storage. The air conditioning unit is any well known or other suitable unit and is located in control chamber 27. Generally, the illustrated air conditioning unit includes a suitable heat exchanger and compressor unit mounted within a base support structure within the control chamber. Cooling coils 68a are connected to the output of the heat exchanger and pass through the lower end of the sauce compartment 20 to provide continuous controlled cooling. A thermostat 69 mounted within the chamber 20 provides for selective control of the air conditioning unit to maintain a predetermined sauce chamber temperature.

Figure 4:
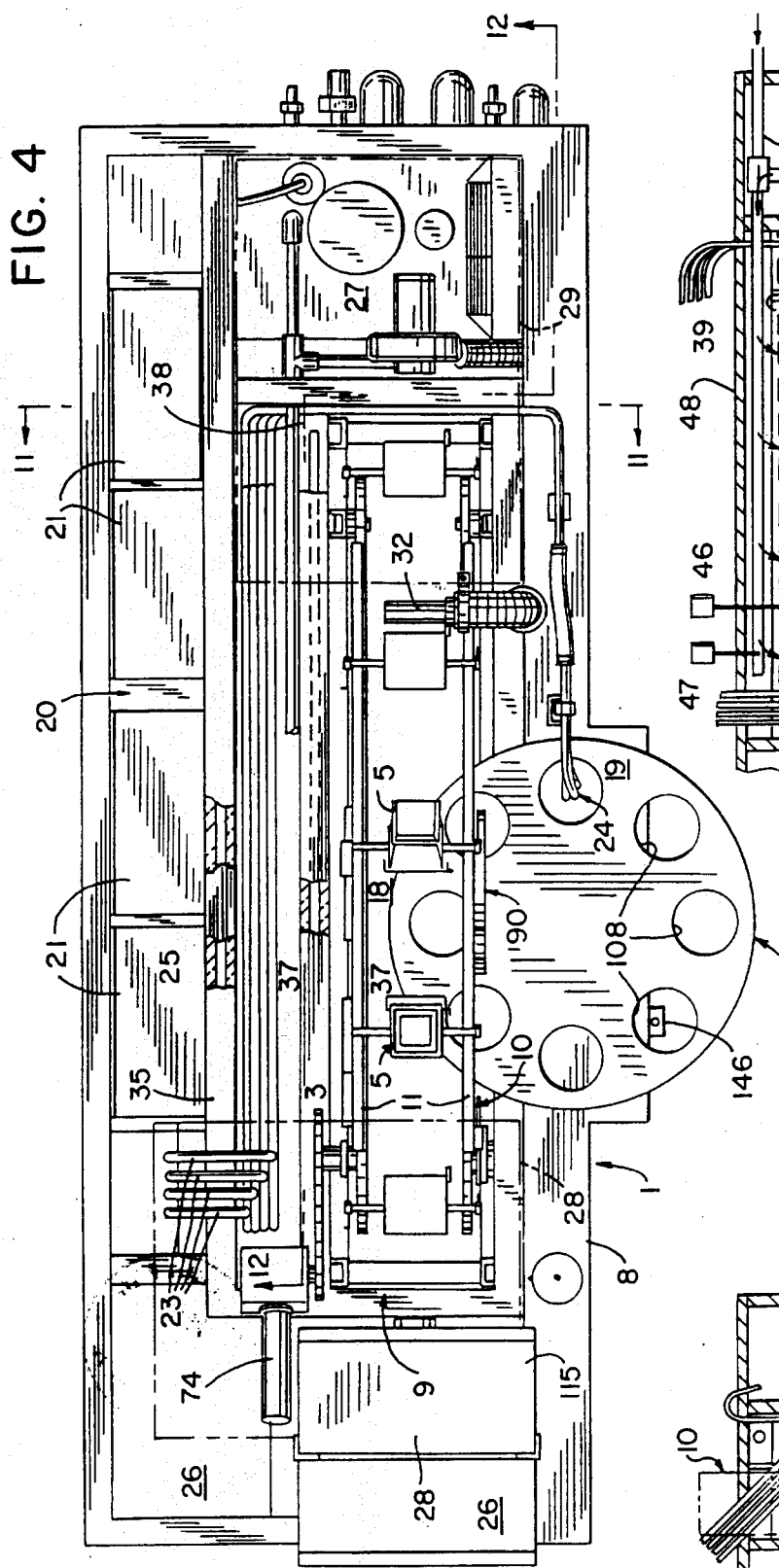
FIG. 4 is a top view of the apparatus shown in FIGS. 2 and 3 with outer cabinet walls removed.
Figure 12:
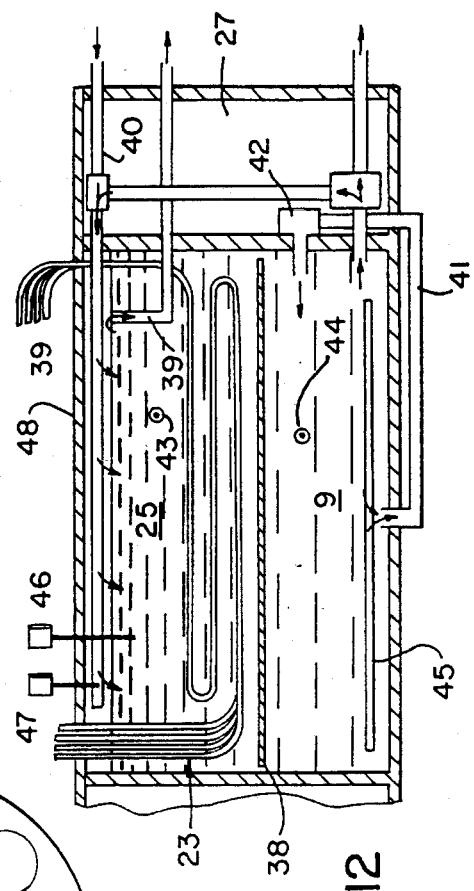
FIG. 12 is a simplified view taken generally on line 12—12 of FIG. 4.
Figure 11:
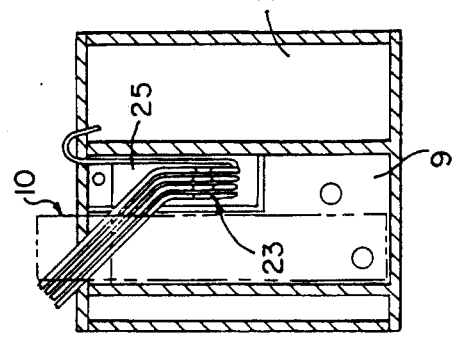
FIG. 11 is a simplified view taken generally on line 11—11 of FIG. 4.
Figure 6:
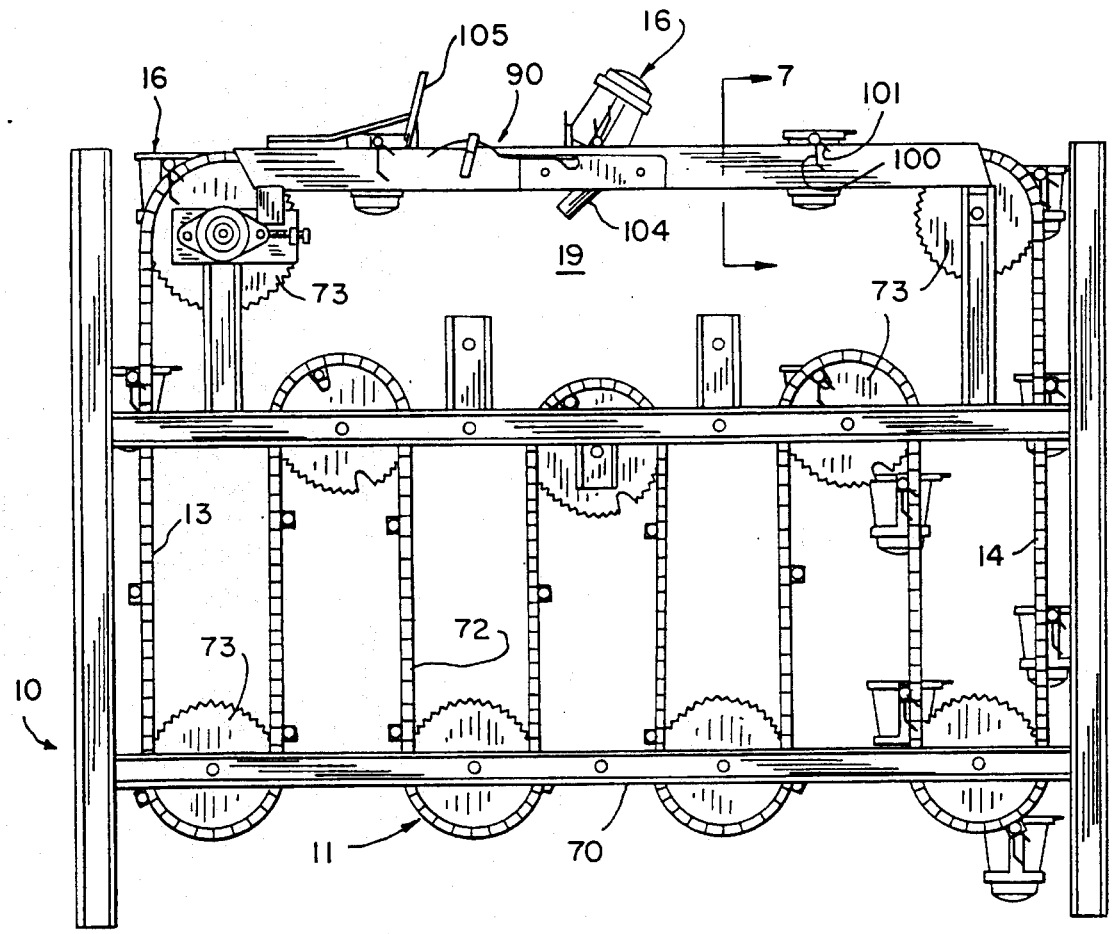
FIG. 6 is an enlarged side view illustrating the conveyor assembly for transport for the cooking basket assembly of the cooking unit.

Referring to FIGS. 2 and 4, the cooled sauces 22 are heated during the transfer through line 23 to the sauce application nozzles 24, as follows.

The sauce hoses or lines 23 pass longitudinally of the cabinet 8 into chamber 25, through the sauce heating chamber 25 and then extend upwardly into the top end enclosure 29 at the opposite end of the sauce heating chamber. The lines 23 extend laterally across the apparatus within the enclosure 29, and particularly adjacent the upper end of the latter. The lines 23 exit at the operator side of the cabinet 8 and extend parallel and longitudinally into the sauce applicating station 19. The lines 23 terminate in the downwardly directed nozzles 24, the discharged end of which are spaced vertically above the indexed dish plate 17 for selective discharge of the sauces 22 into an aligned dish 4 by selective operation of a sauce pump unit 53 or 53a.

For cleaning of the sauce applicating system, a suitable cleaning solution such as an appropriate water solution can be placed in the sauce containers and fed through the sauce systems to thoroughly clean the sauce systems.

Figure 7:
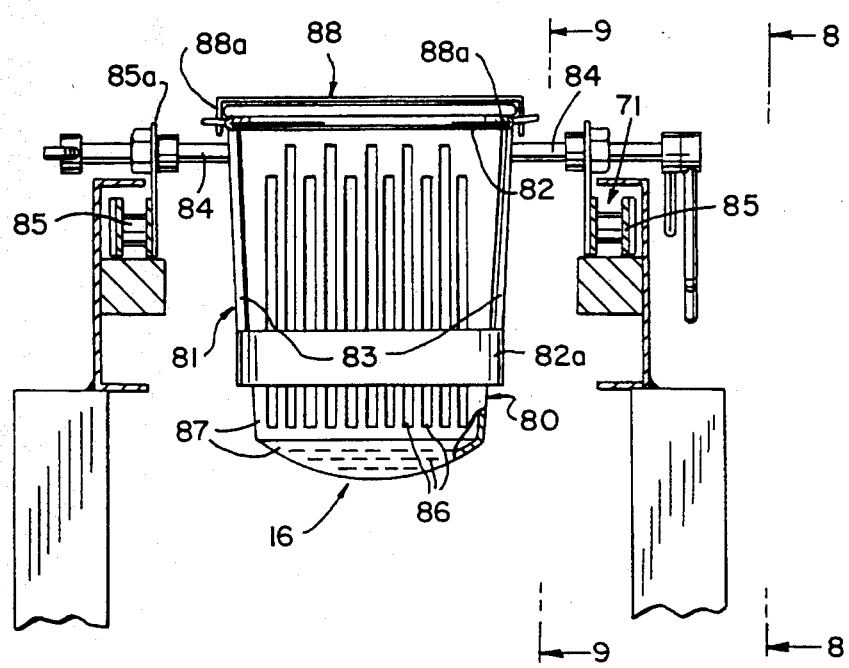
FIG. 7 is an enlarged fragmentary view taken generally on line 7—7 of FIG. 6 and illustrating a basket subassembly and a portion of the cooking apparatus for tipping of the basket to drop the cooked pasta.

More particularly with reference to FIGS. 2, 4 and 7, the conveyor mechanism 10 is formed as a separate self-contained assembly including a frame 70 adapted to be removably mounted within the cooking tank 9 with the lower serpentine conveyor portion or run totally immersed within the hot water bath, and with end vertical runs 13 and 14 extending upwardly above the level of the tank 9 and particularly the cooking water bath. The horizontal run 12 is located in upwardly spaced relation to the water bath and upper cover of the cooking tank 9. The upward spacing is selected to locate the container units 16 immediately above the level of the dish indexing table 17 and the dishes 4 therein and permit inversion of the baskets to an inverted discharge position providing for accurate dropping of the cooked pasta into the aligned dish 4. The horizontal path of the horizontal top run 12 is selected to allow appropriate time for tipping of the unit 16 and discharge of the cooked pasta, followed by reset of the basket to receive the new pasta and closure of the top as follows.

The frame 70 includes vertical and horizontal frame bar members interconnected to form a self-contained supporting structure. The frame width and length essentially conforms to the size of the cooking tank 9 and the frame fits therein in an operating status. The frame 70 extends upwardly of the top of the water tank 9 within the open ends of the end housings or covers 28 and 29.

The conveyor mechanism 10 includes a pair of identical, laterally spaced driven chains 72 supported by appropriately spaced sprockets 73 which are rotatably mounted to the frame members within the open frame 70. In particular, the uppermost top sprockets 73 are secured to the upper ends of the frame 70 to support the horizontal run 12 of the chains 72. Bottom end sprockets 73 are secured to the lower end of the frame in vertical alignment with the top sprockets. A series of laterally spaced bottom sprockets 73 are secured and horizontally aligned with the bottom end sprockets 73. Intermediate spaced sprockets 73 are located above and between the bottom sprockets. The intermediate spaced sprockets 72 locate the chains and baskets below the top level of the water within the cooking tank and define a serpentine path within the water bath. In the illustrated embodiment, eight vertical run, including the end runs 13 and 14, are provided.

An hydraulic drive motor unit 74 is coupled to frame 70 on the downstream end of the horizontal run 12. The motor unit 74 includes a mounting bracket 74a secured to the frame 70. A hydraulic motor 75 secured thereto with gear reducer 76. The gear reducer 76 is coupled by a chain 76a to drive a sprocket 77 secured to the shaft of the downstream upper sprocket 73 of the frame.

The hydraulic motor 75 is connected by suitable high pressure lines 78 to a hydraulic pump unit 79 mounted within the end power chamber or housing 28.

The self-contained conveyor mechanism 10, with the basket units 16 secured to the chains, is readily removed, by decoupling of the hydraulic lines and raising of frame 70, for cleaning, servicing and the like of the conveyor mechanism and the tank 9.

The basket units 16 are pivotally secured to aligned chain links of the chains as follows.

Figure 10:
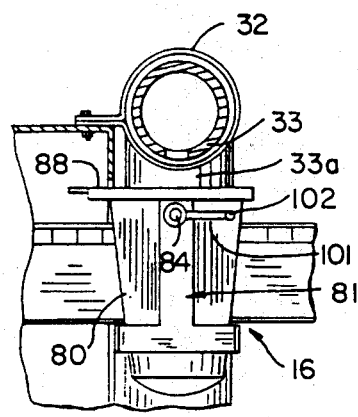
FIG. 10 is a view taken generally on line 10—10 of FIG. 5.

Referring to FIGS. 7 and 10, illustrated container unit 16 includes a separate basket 80 and a frame 81. The basket frame 81 includes spaced encircling brackets 82 and 82a within which the basket is secured. Side member 83 extend along opposite sides of the basket between brackets 82 and 82a. Pivot pins 84 are secured to the upper ends of the members 83 and extend outwardly therefrom. The chain links 85 include pivot plates 85a projecting outwardly from the links with a journal 86 secured thereto. The pivot pins 84 extend through the journals 86 to rotatably support the basket frame 81 and basket 80 between the two chains 71.

The basket 80 is shown as a plastic tub-like member having an open top and apertures 86 in the side and bottom walls 87. The side wall 87 is shown with vertical slots and the bottom wall 87 with small openings. The basket 80 firmly fits within the frame 81 with the upper end slightly above the top frame bracket 82. A top cover 88 is secured to the top of the basket.

The cover 88 has a side flanges 88a which are apertured and pivotally secured to L-shaped pins 86 extending from the side of the top bracket 82a.

The cover 88 is free to drop to a fully open position projecting outwardly from the back sidewall and rearward, as shown in FIG. 9.

Referring to FIGS. 2, 3, 4, 8 and 9, the tipping of the basket unit 16 to invert the basket 80 is created by a camming system including tipping units on the upper edge of the tank 9 and cooperating lever arm units and on the basket units.

The illustrated tipping camming system for the inverting and resetting of the basket units 16 is constructed to conjointly operate with side lever units on each basket unit in such manners as to establish a continuous control of the motion of the basket unit 16 during the complete tipping sequence, as follows.

Generally, the tipping mechanism includes a spring-loaded unit 90 to the operator side of the cooking tank 9 and a second spring-loaded unit 91 to the sauce side of the cooking tank 9. The unit 90 to the operator side initiates the unload movement of the basket unit 16 and stabilizes and resets the basket unit 16 to an upright open-top position. The spring-loaded unit 91 to the sauce side serves to complete the basket inversion to the discharge position and initiate a smooth transfer to the upright position.

More particularly, the unit 90 to the operator side includes a guide plate having a curve upstream portion with a front vertical leg 92 merging into a horizontal leg 93 which extends past the discharge or unload station 19. An inverted curved spring stabilizer leg 94 extends upwardly from the horizontal portion and then downwardly in a smooth path to stabilize the basket resetting motion.

The tipping unit 91 on the sauce side of the tank 9 includes an inclined upstream cam 95 depending and merging into a linear horizontal run or leg 96 extending into the upstream end of the unload location 19. Cam 95 is located upstream of the leg 92. Leg 96 of unit 91 merges to a smooth concave leg 97 to effect a smooth inversion of the basket unit 16. In addition, leg 96 and 97 have an opposed spring guide 98 forming a linear guide path ending in 9 multi-leaf spring 99 overlying the curved portion to prevent rapid dropping of the basket unit 16 from the inverted position and to guide the basket unit 16 with a smooth motion to the upright position.

Referring particularly to FIGS. 1, 8 and 9, the basket unit 16 includes a pair of angularly offset levers 100 and 101 secured to the extended end of the basket pivot pin 84 to the operator side of the apparatus. The offset levers 100 and 101 which engage unit 90, are secured to the pivot pin 84, with a longer lever 100 extending vertical from the pin 84 as the basket moves into tipping unit 90 toward the unloading station 19. The outer end of lever 100 is angularly offset. A shorter lever 101 trails the longer lever 100 with an angular offset therebetween.

The basket unit 16 includes a tip lever 102 secured to the opposite side of the basket unit 16 from levers 100 and 101 and extended horizontally with the basket in the upright position. Lever 102 has an offset leg 103 which engages the tipping unit 91 to the sauce side of the tank 9. The conjoint tipping action is as follow.

The operator side cam unit 90 is secured to a side member of the conveyor frame 70 in the path of the offset levers 100 and 101. The cam unit 90, as most clearly shown in FIG. 8, includes the curved cam leg 92 upstream of the unloading station 19. The longer lever 100 is aligned with the cam leg 92, and as the lever moves into engagement with leg 93, it initiates tipping of the container unit 16 and then rides along the flat portion or cam leg 93. The lever 102 to the appropriate side pivots downwardly as shown in FIGS. 8 and 9.

The L-shaped lever 102 to the sauce side of conveyor rides along the rail or frame into the tipping unit 91. The offset leg 103 of lever 102 engages the inclined ramp 95 which further tips the basket unit 16 to a horizontal position, with the leg 103 moving through the linear guide 98 to the inverted curved portion 97. As the leg 93 moves up the curved portion 97, the basket unit 16 rotates slightly past the 180 degree position. The basket unit 16 is thereby rotated through about 180 degrees, with the cover 89 falling open to discharge the pasta 3 into the aligned dish 4.

An inclined plate 104 is shown secured to the conveyor frame 70 at the unload station 18. The plate 104 is located beneath the inverted basket to guide the pasta 3 into the dish 4. As the basket unit 16 inverts, the leg 103 rides up over the curved portion 97, with leg 93 engaging the underside of the leaf spring 99 of unit 91. The leg 97 defines a cantilevered spring to absorb any shock forces as the basket unit inverts.

As the pasta 3 drops into dish 4, the back end of basket lever, on the operator side, rides up the spring cam leg 94 of unit 90, and causes the basket unit 16 to continue rotation and tipping about the pivot supports. The trailing lever 101 remains in engagement on the spring cam leg 94 and supports the basket unit 16 as it continues to rotate (counterclockwise as shown in FIG. 8). The lever 101 moves off leg 94 and the baskets unit 16 moves to the upright position, shown in FIGS. 8 and 9.

An end guide or channel 105 receives the offset pin 103 on arm 102 on the basket unit 16 to guide the basket unit 16 in the open position through the upstream end of path 12 to receive a new charge of food product.

The cover 89 includes a trailing reset lever 106 projecting downwardly and rearwardly, A cover reset arm 107 is secured to the guide 105 in the path of lever 106 with the cover 89 open and serves to tip and close cover 89 as the basket unit 16 moves through the end of the upper run 12 to the vertical run 13.

Although any tipping and reset mechanism can of course be used, the illustrated structures which include effective resilient loading of the tipping mechanism and the basket unit 16 during the tipping action is desirable in providing smooth movement of the assembly for reliable and repeatable removal and addition of the pasta.

Each basket unit 16 is unloaded and reset in the above sequence to transfer pasta 3 to dish 4.

In the illustrated embodiment of the invention, the dish index table 17 (FIGS. 2 and 4) is shown as a rotating metal plate having a vertical shaft journalled in a bearing structure 107 which is secured to the sidewall of the cooking cabinet. The table 17 is shown with a plurality of equicircumferentially distributed peripheral openings 108, each of which is of an identical size. The dishes 4 fit within and are supported on the table projecting into the openings for movement about the axis of rotation. The radius to the dish openings locates each dish 4 with its center tangent to the center of the basket 80 at the unload station 18. An hydraulic motor 109 is secured to the frame and coupled through a gear reduction unit 109a to drive the shaft and table 17. The hydraulic motor 109 is actuated in appropriate timed relation to provide an intermittent or step movement of the trays. The hydraulic motor 109 has a pair of input/output lines 110 coupled to the hydraulic power pump unit 79 in end chamber 26. As shown in the schematic circuit FIG. 13 operating fluid to the hydraulic motor 109 is operated in predetermined timed relation to the basket conveyor speed. In this manner, a dish 4 is rotated into precise relation to the discharge location 18. The basket 80 moving through the discharge location 18 is then inverted to dump the cooked pasta into the dish. At the end of the unload cycle, the index table 17 is rotated one step, aligning an empty dish 4 to receive the next pasta serving from the next basket, and simultaneously, moving a filled dish into alignment with the sauce discharge nozzles 24.

The dishes 4 are held in a fixed alignment during the unloading cycle for the next basket. During this period the appropriate sauce pump 53 or 53a is activated to discharge the selected sauce 22 to the aligned dish 4.

The apparatus continues to cycle the unloading of successive basket units and realignment of empty dishes to receive cooked pasta which are then covered with the proper sauce. The sauce covered pasta dish is moved to the discharge station for manual removal and transfer to the conveyor.

In the illustrated embodiment of the invention, the transfer conveyor 7 is shown as a belt conveyor unit. The conveyor unit can operate continuously or intermittently to carry the finished dishes to a distribution location or the like.

In the illustrated embodiment of the invention, a manual control panel 115 is provided for actuating of the system including application of the sauce solution. Generally, a series of similar pasta orders will be processed through the pasta apparatus to avoid the necessity for the operator to continuously set the manual control. However, the operator can move the control at each step to sequentially select the sauces.

The power chamber is formed within one end of the cabinet 8. The first and second motor-driven hydraulic pump units are mounted within the cabinet in stacked relation and interconnected to a suitable electric motors. The output of the hydraulic pump units are coupled to a plurality of pressure regulators. Each pressure regulator establishes a hydraulic supply at a regulated pressure related to the specification of the motors, pumps and valves driven therefrom. In the illustrated embodiment, four different regulators are illustrated. The one regulator provides a high pressure, high volume liquid supply for operating of the conveyor hydraulic motor and moving of the pasta baskets through the conveyor loop. The second regulator has its output connected to provide a pressurized hydraulic liquid to the indexing turret motor for accurate and smooth rotation of the turret plate 17. The third and fourth regulators are respectively coupled to pairs of the sauce pumps for corresponding actuation thereof and transfer of the selected sauce at a constant flow rate such that the quantity of sauce applied to the pasta is controlled by suitable time operation of a pump unit.

The various controls for either a manual, a semi-automated or a fully-automated control of the apparatus may be provided for operating the apparatus. The control may readily be adapted to various forms of electronic or electrical control systems.

Figure 13:
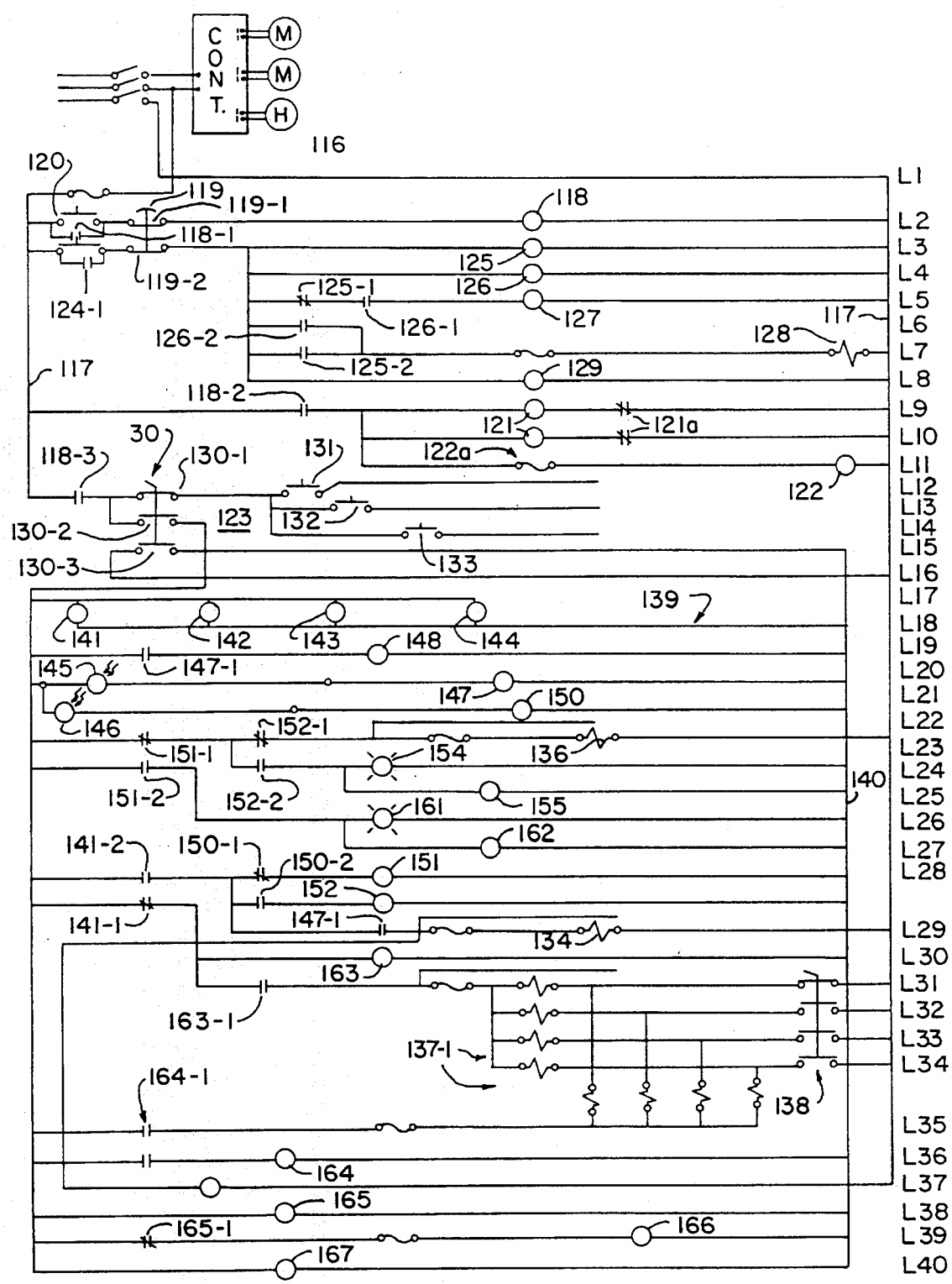
FIG. 13 is a schematic of a control circuit for the apparatus of FIGS. 1–12.

A schematic circuit of a hard wired control system is shown in FIG. 13 in an across-the-line circuit diagram. The several cross lines are identified as lines L-1 through L-43 for purpose of reference. The system is adapted to be energized from a 3-wire 220 volt single phase supply. The two hydraulic pump motors, and the water heater for heating of the cooking water are connected to the incoming power supply lines 115 through a main disconnect switch, contactors and protective fuse elements shown as part of circuit board at 116. A pair of 100 volt control power lines 117 and 118 are connected between the one higher voltage line and the neutral line 115 to provide a single phase input to the control circuit, and particularly to lines L-1 through L-43. The control circuit includes a master control relay 118 (Line L-2) connected in series with a normally closed-emergency push button stop switch 119 and a normally open push button start switch 120. The relay 118 controls a set of normally open (N.O.) latch contacts 118-1 which are connected in parallel with the start switch and latch the relay in circuit. Relay 118 includes N.O. contact 118-2 and 118-3 (L-9) to energize the main motor contactor 121 in lines L-9 and L-10 and the blower motors 122 in line L-11. The overload contacts 121a are formed as an integral part of the motor structure and respond to undesirable overloading of the motors such as may occur if the mechanism fails or becomes jammed for any reason. Typically, the overload contacts will be current or heat responsive switches which respond to the corresponding parameter of the motor. The fan motors 122 are protected by a fuse 122a in accordance with known practice. Relay 118 also includes N.O. contracts 118-3 (L-12) to power a manual/auto control section 123 (L-12 through L-16).

A second main or master control switch 124 (L-3) provides power to the heaters and related controls.

A water level control relay 125 (L-3), a heater control relay 126 (L-4), the heater contactor 127 (L-5), a fill water solenoid 128 (L-7), and cooking water temperature control relay 129 (L-8) are parallel connected between switch 124 and the neutral line 117.

The heater relay 126 has a set of N.O. latch contacts 126-1 connected in parallel with the heater switch 124 latch power to the several control relays described above. Thus, relays 118 and 124 are latched in circuit through the emergency switch 119 and maintain the power connection until such time as the emergency stop button 119 is actuated or the main disconnect switch is opened. The emergency stop button switch 119 thus includes normally closed (N.C.) contacts 119-1 and 119-2 connected in series with a No.O. contacts 118-1 and 124-1, respectively.

The water level control relay controls N.C. contacts 125-1 (L-5) restricts operation of the heater contactor 127 to insure an appropriate water level in the cooking tank 9. The temperature relay 129 controls a set of N.O. contacts 129-1 (L-5) in series with contacts 125-1 to energize the heater and maintain the water temperature of the desired cooking temperature with the appropriate water level present. The heater relay contacts 126-1 thus control contactor 127, the N.O. contacts 127-1 of which connect the heater to the incoming 220 volt power lines at board 116 to selectively activate the heater as necessary to maintain the water temperature in the cooking tank and the sauce chamber.

Relays 125 and 126 similarly provide conjoint control of the relays 125 and 126 control parallel connected contacts 125-1 and 126-1, in series with relay 128. Upon activation of either relay 125 or relay 126, fill relay 129 is energized to supply water to the chamber 25 and thereby to tank 9.

In summary, temperature control relay 129 is energized simultaneously with latching in of the heater control relay 126. If the water is at proper temperature, the controller will close the contact TC1 to condition the heater for operation in the presence of a proper water level. If the water is at a proper temperature, the contact opens to prevent the continue unnecessary and undesired heating of the water.

Thus, the main relay for controlling of the overall system as well as the water level, the heating of the water, the operation of the pumps and motors and the blower motors are controlled directly through the power turn on for operating the cooking process. Actual execution of a cooking process is controlled by the manual/auto switch section 123 at L-12 through L-16. The illustrated manual/auto switch 130 is a two-position switch having three contacts 130-1; 130-2 and 130-3, connected in parallel circuit to the master control relay N.O. contacts 118-3. N.C. contacts 130-1 connect individual manual push buttons switches 131, 132, and 133 are in lines L-12, -13, and -14 respectively. The switch 131 controls the table motor 109 and is connected in the series at line L-29 to the one side of table solenoid 134 in line L-29, the return side of which is connected to neutral line 117 for manual positioning of the dish index table 17.

Pushbutton table switch 132 controls the bucket conveyor motor 74 is similarly connected in line L-13 between the manual/auto control switch 130 and thereby the incoming side of the main power line 117 and to the motor control solenoid 136 at line L-22. Bucket switch 132 thus permits manual advance of the bucket units 16.

A pushbutton sauce switch 133 is similarly connected through line L-12 a bank of sauce pump solenoids 137 at Line L-31. Four separate forward pump solenoids 137; 137-2; 137-3 and 137-4 at lines L-34, L-35, L-36 and L-37, respectively, are provided connected in common to each other at line L-31 with the return side of each such solenoid separately connected via individual contacts of a four position rotary selection switch 138 to the neutral line 117. The positioning of the four switch 138 closes one of the sets of contacts and opens all other contacts to effectively provide for energization of one, and only one, of the four solenoids 137 and thereby the related sauce pump 53 or 53a.

The sauce pumps 53 and 53a are also controlled by reversing solenoids 137-5; 137-6; 137-7 and 137-8 at lines L-34 through L-38. The reversing solenoids however are connected in circuit through a bucket jam unit, as hereinafter described.

In summary, the three push button switches 131; 132 and 133 in combination with the pump selection switch 138 permits manual control of the cooking apparatus, with the various interlocking controls which are also effected during the automated cycle.

The manual/auto switch 130 (L-12) includes two additional sets of N.O. contacts 130-2 and 130-3 (L-13 and L-14) connecting lines 117 to the contact power line 117 to an "auto" power section 139 for automated operation of the cooling apparatus system. The "auto" control section includes a neutral line 140 connected to neutral line 117 via contacts 130-3. Some components of the "auto" control section 139 are connected directly to neutral line 117. A relay 141 and three timers 142, 143, and 144 are connected in parallel at lines L-16 and L-17 between the auto/power lines, are simultaneously energized upon the closing of the "auto" contacts 130-2 and 130-3. The relay 141 controls N.C. contacts 141-1 at line L-28 and normally open contacts 141-2 at line L-27. The relay 141 is an alternate relay and periodically reverses the contact position to activate the circuits at lines L-27 and L-29. Line L-27 circuit controls the bucket discharge and L-28 controls the sauce discharge as hereinafter described. In the "auto" position, the conveyor drive solenoid 136 (L-23) is connected across lines 117 in series with normally closed contacts 151-1 and 151-2 of the bowl control relays. The position of the dishes 4 in the index table 17 and the unload location 18 for receiving of sauce and pasta is thus continuously monitored. Electric bucket and dish sensors 145 and 146 are connected to the control power lines 117 and 140 to monitor the proper location of the bucket unit 16 in the horizontal run 12 and dishes on table 17 to signal the operation of the hydraulic motors for related movement of the loop conveyor 11 and the dish table 17, and operation of sauce pumps 53 or 53a, as follows.

The bucket sensor 145 is shown as an electric eye unit connected in line L-20 in series with a control relay 147. An initiate control relay 148 for the index table drive is connected in series with the N.O. contact 147-1 in line L-17 with a dish 4 in position to receive pasta, the sensor 145 is de-energized and relay 147 is off. As a bucket moves to the unloading station, the table run timer is energized and after a selected delay period, related to the unloading of the container unit 16 into the dish 4, the timer contacts 147-1 close and establish operation of the hydraulic motor for the table.

The electric eye 146 for the table position controls energization of a relay 150 (L-21). The relay 150 includes N.C. contacts 150-1 in line L-27 and N.O. contacts 150-2 in the adjacent line L-28. Lines L-27 and L-28 have the one side connected in common with line L-29 high line 117 and particularly the power side of the auto/power line via the N.O. contacts 141-2 of the alternating relay 141. N.C. contacts 150-1 of the relay 150 are in series with a "no" bowl timer 151 (L-27) which is energized whenever the alternating relay 141 is energized to close N.O. contacts 141-2 and relay 150 is not energized. With a dish 4 in position to receive sauce, relay 150 will be energized, open its contacts 150-1 and permit operation of a sauce pump 53 or 53a for delivering of the containers. If a dish is not present, the relay 150 will be energized as the results of the energization of the electric eye sensor and will open the N.C. contacts 150-1 and close the N.O. contacts 150-2 in line L-28. A new bowl delay timer 152 is connected in line L-28 and is energized for a predetermined period of time to permit the insertion of a new bowl. The relay 152 will be energized until an appropriate dish 4 is introduced into the table thereby de-energizing relay timer 150. If no dish is inserted timer 152 times out and actuates/contacts 152-1 (L-23) and N.O. contacts 152-2 (L-24). Opening of contacts 152-1 (L-23) de-energizes bucket drive solenoid 136.

Closing contacts 152-2 (L-24) energizes a new bowl light 154 and a buzzer 155 to alert the operator of the fault creating shutdown.

Relay 151 (L-27) controls a set of N.C. contacts 151-1 in line L-23 and N.O. contacts 151-2 in line L-25. If a dish 4 is not in location in the table 17, the dish relay 150 in series with eye 146 is energized and after a delay time opens the contacts 151-1 and closes N.O. contacts 151-2. Opening contacts 151-1 open the circuit to drive solenoid 136 (L-23); thereby stopping operation of the conveyor drive. N.C. contacts 151-1 and 152-1 in line L-21 thus conjointly control the automated operation of the conveyor drive solenoid and insures that the drive is not actuated, with the resulting tipping of a bucket unit 16, in the absence of a bowl or dish in the appropriate location for receiving of the food product. The timer is used to allow the appropriate movement of the bucket drive till such time as the buckets enters into the tipping mechanism. Thus the conveyor drive operates during the "no-bowl" delay time to bring the bucket unit 16 adjacent to the discharge position 18 but cannot move through the discharge position without a dish 4 in location to receive the pasta.

Simultaneously, with the stoppage of the conveyer drive, the N.O. contacts 151-2 (L-24) close and supply power to line L-25 and the parallel line L-26. A "no-dish" warning light 161 is connected in line L-25 and a related buzzer 162 is connected in line L-26 to provide both a visual and audible Warnings to the operator that a bowl is missing and must be inserted into the system.

In addition, at line L-30, a sauce control is connected in circuit via the N.O. contacts 163-1 or a timer relay 163 (L-30). Line L-30 is connected in circuit through the N.O. contacts 141-1 of the alternating relay 141. Relay 163 is thus connected to power with contacts 141-1 in the closed position and initiates a timing cycle to close contacts 163-1. Sauce is pumped by operator of an appropriate pump 53 or 53a in accordance with the setting of switch unit 138. For reverse operation of the sauce pumps, N.O. contacts 164-1 (L-35) of a sauce pump reverse relay 164 (L-39). When contacts 164-1 close, reverse operation of the selected pump solenoid 13 for reversing of the selected pump is established to withdraw sauce from the corresponding line 23 back to the corresponding sauce container 21. The reverse initiate relay 164 is connected in line L-39 in series with a set of N.O. contacts 147-3 of the control relay 147. As previously described, the electric eye unit 145 controls energization of the relay 147. Thus, as the container moves from the unload station, the sauce pump operation is reversed to terminate the sauce discharge and prevent gravity flow from the nozzle 24.

A sauce bath temperature controller 165 is shown at line L-41, with N.C. contacts 165-1 of a circulating pump 166 (L-42). The circulating pump 166 circulates water through the cooking tank 9 and the sauce heating chamber 25 and thereby provide effective heating of the sauce moving through line 23 to the discharge nozzle 24. A sauce temperature monitor 167 is connected in circuit at line L-47 and provides temperature readout of the sauce temperature.

FIG. 14 is a schematic illustration of the hydraulic system for driving of the sauce pump motors 64, the conveyor motor 74 and dish table motor 109. As illustrated, the one motor driven hydraulic pump 79 provided operates the conveyor motor 74 and the dish table motor 109. The second 64 hydraulic pump unit 111 powers the motors of the sauce pump units 53 and 53a.

Each of the pump motors has it high pressure side connected through a pressure regulator to provide a predetermined constant output pressure for operating of the respective pumps. The return side is provided with an appropriate check valve and heat exchanger unit 170 in accordance with known constructions for hydraulic supply systems.

Referring first to the drive systems for conveyor motor 74 and the table motor 109, a three-position hydraulic valve unit 171 has an input port 172 connected to the output of the regulator 170 and a return port 173 connected directly to the return side of the system. The valve 171 includes a pair of output ports 174 and 175 shown diagrammatically aligned with the input ports 172 and 173. The output ports 174 and 175 are connected to the hydraulic motor ports. The conveyor motor 74 is mounted for a reversible operation and each of the lines to the conveyor motor is shown with a safety release valve and parallel check valve unit 176 to protect the motor against high pressure conditions in the event of conveyor blockage and the like. The valve 171 has an illustrated center position with the inlet ports 172 and 173 directly interconnected to provide for direct circulation of the hydraulic liquid bypassing the hydraulic valve outlet ports 174 and 175 and with the outputs blocked or closed. The valve is adapted to be moved to interconnect a pair of parallel passageways 177 into alignment with the inlet and outlet ports and of course simultaneously removing the stand-by interconnection. In this mode, the high pressure supply is connected to one side of the conveyor motor with the opposite side defining a return passageway to the return side of the pump. This may be assumed to drive the conveyor in a forward direction.

In an opposite or alternate valve position, a pair of crossed passageways 178 are aligned with the inlet and outlet ports and thereby reverse the connection of the pump unit 79 to the conveyor motor 74. This process provides for a reverse drive of the conveyor motor and conveyor unit.

A simple on/off valve unit 179 connects the forward pressure side of the conveyor motor 74 to the table motor 109. The valve unit 179 is shown with an inlet and an outlet ports 180 and 181 in the closed state. The valve 179 is movable to align a parallel passageway 181 with the ports to open the lines and pressurize the motor 109. The opposite side of the table motor is coupled directly to the return side or line of the pump unit.

The return table 109 is thereby driven whenever the table valve unit 179 is switched to open and the conveyor motor 74 is also operating in a forward direction.

The hydraulic sauce pumps 53 and particularly each motor is similarly connected through three-position electrically actuated valves 182 through 182c to the corresponding sauce hydraulic supply 21. Each valve 182 is the same as the valve 171 in structure. In the sauce system, the inlet ports of the first pump valve 182A is connected to the high pressure line and side of the regulator 170, with the opposite inlet port connected to the first inlet port of the second valve 182a and so forth, and with the last of the valves for the pumps 53 connected directly to the return side of the supply through a pressure relief valve 183. The inlet ports of valves 182 are thus connected in series to the supply 170. With the valves in the stand-by position, hydraulic liquid flows through the inlet port successively and provides a potential supply at the inlet ports for each of the three position valves 182-182C. Only one valve will be offset at any given time. When that valve is offset, the hyraulic liquid is then diverted to the pump motor 64 and operates the corresponding sauce pump unit 53 or 53a.

The sauce valves have the first direct connection section and a reverse connection section which can be moved into alignment with the inlet and outlet ports as described for valve 171. It thus provides for a forward rotation of the pump unit and a reverse rotation of the sauce pump unit.

In addition, an auxiliary pump assembly may be provided with a separate interconnection to the system for operating the motor while discontinuing operation of the sauce motors. Thus, in the illustrated embodiment, the motor is coupled to the sauce pump hydraulic supply through a three positioned valve corresponding to those previously described. The inlet ports are connected to the pump unit through a special two position valve. In the first position, the power side of the valve is connected directly to the hydraulic sauce pump motors. The supply connection to the auxiliary valve is disconnected with the auxiliary line connected directly to a dead port. In the alternate position of the valve, the high pressure side of the pump unit is disconnected from the sauce pumps and connected directly to the one side of the inlet ports of the auxiliary valve, the opposite side of which is connected directly to the return line of the pump unit. In this position, operative fluid can only be supplied from the sauce pump unit to the auxiliary valve unit in the interrelated motor.

The empty dishes 4 to be filled are shown supplied at a loading table 6 along with pre-packaged pasta servings 2. The pasta 3 may be provided in individual bags or other individual containers for rapid manual unloading into the empty container downstream of the basket unloading station. An automated pasta transfer system may also be provided for supplying pasta to the conveyor mounted baskets or prefilled baskets may be provided with a system for replacement of releasable baskets coupled to the conveyor unit.

Although in the illustrated embodiment, manual loading of the pasta 3 as well as the removal of filled dishes 4 is illustrated, any suitable automated system can readily be provided including appropriate loading and unloading apparatus operated in interrelated sequence with the indexing table.

The illustrated apparatus is a compact portable cooking apparatus which can be readily installed in a relatively small establishment or kitchen. The apparatus thus provides a convenient, on-site cooking unit for preparing individual serving portions of pasta or other food products and particularly adapts to a "fast-food" restaurant service with more conventional food service quality. The apparatus may be made of a rugged construction and specially constructed for total effective cleaning of the various operating and component parts such as required for processing of food products.

Various modes of carrying out the invention are contemplated as being within the scope of the following claims particularly pointing out and distinctly claiming the subject matter which is regarded as the invention.

I claim:

1. A pump supply apparatus for delivery of a sauce product including a sauce product having chunky material to a discharge unit, comprising a piston-cylinder unit including a cylinder having an input port and an external sauce connector for connection to a bulk supply of sauce and an outlet port and an external receiver connector for supplying sauce to a receiving unit, an inlet valve unit connected between said sauce connector and said pump inlet port, an outlet valve unit connected between said pump outlet port and said receiver connector, said inlet valve unit including a valve body with an inlet passageway connected in series between said input and output portion for flow through the valve unit, said outlet valve unit including a valve body with an outlet passageway connected in series between said outlet port and said receiver connector for flow through said valve unit, a positive closure unit having an opening and movable within said inlet passageway and said outlet passageway between a first position with said opening aligned with one of said passageways and a second position aligned with the opening of the other of said passageways, said closure unit being constructed and arranged to disrupt and displace all chunky material located within said opening.

2. The apparatus of claim 1, including control means for cyclically moving said closure unit between said first and second positions whereby one of said valve units is open and the other of said valve units is closed and thereby providing for transfer of a predetermined quantity of sauce during each cycle of said pump unit.

3. The apparatus of claim 2, wherein said bodies of said inlet valve unit and said outlet valve unit are connected with said valve passageways in said side-by-side relation, said closure unit includes a sliding valve member slidably mounted in said valve bodies and having said opening adapted to be aligned with said inlet passageway to transfer sauce into said cylinder and moved to align said opening with said outlet passageway to discharge said sauce product, and having a solid body portion within the other of said aligned passageways to positively seal said other passageway for transfer of said sauce product to and from said cylinder.

4. A pump apparatus for delivery of a liquified food product including a liquified food product and having chunky materials therein, comprising a piston-cylinder unit including a cylinder having an inlet/outlet end, a valve unit secured to said inlet/outlet end, said valve unit including a body member secured to said end in a fluid-tight connection, said body having an inlet opening and a discharge opening diametrically spaced, a valve plate slidably mounted within said valve body in fluid tight sliding engagement therein, said valve plate having a single opening adapted to be aligned with said inlet opening and alternatively with said outlet opening, said valve body closing the opening not aligned with said single opening, said piston-cylinder unit having a piston member slidably mounted therein and creating a suction force during movement away from said inlet/outlet end and a pressure within said cylinder for intake and discharge of said product, a pump motor unit coupled to said piston-member for cyclically operating the piston member, a valve plate motor unit for sliding of said valve plate between said inlet opening and said discharge opening, and a control unit connected to said motor units for operating of said valve unit in synchronism with the movement of said piston-member to align said single opening with said inlet opening during the retraction of said piston member for drawing of said sauce product into said cylinder and for alternately aligning said single opening with said discharge opening in synchronism with the movement of said piston member toward said discharge end, said openings being constructed to positively sever any chunky material within the respective single opening upon movement of the single opening through said respective inlet opening and discharge opening and thereby establish positive controlled movement of the food product into and from said cylinder unit in precise controlled amounts.

5. The apparatus of claim 4, wherein said pump motor unit includes a first hydraulic cylinder unit, said hydraulic cylinder unit including a piston rod coupled to the piston rod of said pump unit, an adjustable stop means secured to one of said piston rods for controlling the discharge movement of said piston rod to control the discharge quantity of food product, and a hydraulic power source connected to said hydraulic cylinder unit and to said valve plate motor unit to reverse the operation of the motor units in synchronism with the engagement of said stop unit to control the discharge quantity of said product and recycle said pump apparatus.

6. The apparatus of claim 5, wherein said valve plate motor unit includes a second hydraulic cylinder unit, said first and second hydraulic units being connected to a common hydraulic source responsive to the position of said piston member.

* * * * *